United States Patent
King (10) Patent No.: US 6,212,576 B1
(45) Date of Patent: *Apr. 3, 2001

(54) OPERATING SYSTEM INTERFACE FOR USE WITH MULTITASKING GSM PROTOCOL STACKS

(75) Inventor: Michael Roy King, Axams (AT)

(73) Assignee: Optimay Corporation, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 08/788,845

(22) Filed: Jan. 27, 1997

(51) Int. Cl.$^7$ .................................................. G06F 9/46

(52) U.S. Cl. ............................................... 709/328
(58) Field of Search .......................... 395/566; 709/300, 709/328; 370/321, 337, 347

(56) References Cited

U.S. PATENT DOCUMENTS

| 4,768,150 | 8/1988 | Chang et al. ........................ 364/300 |
| 4,847,751 | * 7/1989 | Nakade et al. ....................... 364/200 |

(List continued on next page.)

FOREIGN PATENT DOCUMENTS

| 0485935 | 5/1992 | (EP) .............................. H04Q/7/04 |
| 0576409 | 12/1993 | (EP) . | |

OTHER PUBLICATIONS

Siemens Product Overview Brochure09.95, entitled "ICs for Communications—Goldplus Chip Set", pp. 1–12.

"Software Radios Survey, Critical Evaluation and Future Directions", by J. Mitola III, Proceedings of the National Telesystems Conference (NTC), Washington, May 19–20, 1992, No. , May 19, 1992, Institute of Electrical and Electronics Engineers, pp. 13.15 thru 13.23.

Alexander et al., "Integrating the Portable APPN Protocol Stack into a Multiprotocol Router," IEEE, pp. 133–141, Mar. 1995.*

Krupczak et al., "Protocol Portability through Module Encapsulation*," IEEE, pp. 56–63, Sep. 1996.*

(GSM) Global System for Mobile Communications, "Digital Cellular Telecommunications System (Phase 2+); Radio Transmission and Reception (GMS 05.05 Version 6.5.0. Release 1997)," EN 300 910 V6.5.0 (1999–07).

(GSM) Global System for Mobile Communications, "Digital Cellular Telecommunications System (Phase 2+); Radio Subsystem Link Control, (GMS 05.08 Version 6.5.0. Release 1997)." EN 300 911, V6.5.0 (1999–07).

(GSM) Global System for Mobile Communications, "Digital Cellular Telecommunications System (Phase 2+); Radio Subsystem Synchronization, (GMS 05.10 Version 6.5.0. Release 1997)," EN 300 912, V6.5.0 (1999–07).

Primary Examiner—Zarni Maung
Assistant Examiner—Gary S. Fourson
(74) Attorney, Agent, or Firm—Dickstein Shapiro Morin & Oshinsky LLP (57) ABSTRACT

A GSM transceiver for use in a GSM network is disclosed. The transceiver includes a multilayer protocol stack for executing a plurality of asynchronous tasks which are encoded with a universal and generic instruction set used for communicating between and synchronizing the tasks; a multitasking operating system having a set of operating system instructions and providing prioritized execution of the tasks by execution of the operating system instructions; an operating system interface causing instructions of the universal instruction set to be carried out by the multitasking operating system so that each universal instruction of the universal instruction set is executed as a sequence of at least one instruction of the operating system instruction set; and at least one processor controlled by the operating system to execute the asynchronous tasks.

32 Claims, 4 Drawing Sheets

U.S. PATENT DOCUMENTS

| | | | |
|---|---|---|---|
| 4,970,639 | 11/1990 | Diefendorf et al. | 364/200 |
| 5,067,104 | 11/1991 | Krishnakumar | 395/375 |
| 5,265,252 | 11/1993 | Rawson, III et al. | 395/700 |
| 5,278,834 | 1/1994 | Mazzola | 370/94.1 |
| 5,289,179 | 2/1994 | Beeson, Jr. et al. | 340/825.5 |
| 5,313,578 | 5/1994 | Handorf | 395/200 |
| 5,363,315 | 11/1994 | Weiss et al. | 364/514 |
| 5,388,258 | 2/1995 | Larsson et al. | 395/600 |
| 5,408,617 | 4/1995 | Yoshida | 395/325 |
| 5,418,953 | 5/1995 | Hunt et al. | 395/650 |
| 5,454,110 | 9/1995 | Kannan et al. | 395/700 |
| 5,465,364 | 11/1995 | Lathrop et al. | 395/700 |
| 5,471,471 | 11/1995 | Freeburg et al. | 370/79 |
| 5,485,460 | 1/1996 | Schrier et al. | 370/94.1 |
| 5,490,275 | 2/1996 | Sandvos et al. | 395/700 |
| 5,517,635 | 5/1996 | Cross et al. | 395/500 |
| 5,519,851 | 5/1996 | Bender et al. | |
| 6,064,660 * | 5/2000 | Cagney | 370/321 |

* cited by examiner

OPERATING SYSTEM INTERFACE FOR USE WITH MULTITASKING GSM PROTOCOL STACKS

CROSS-REFERENCE TO RELATED APPLICATION

Reference is made to U.S. patent application Ser. No. 08/766,583 now U.S. Pat. No. 6,064,660, entitled "GSM Transceiver With Portable Protocol Stack", filed on Dec. 12, 1996, which application is incorporated by reference in its entirety.

APPENDIX

Figure 3:
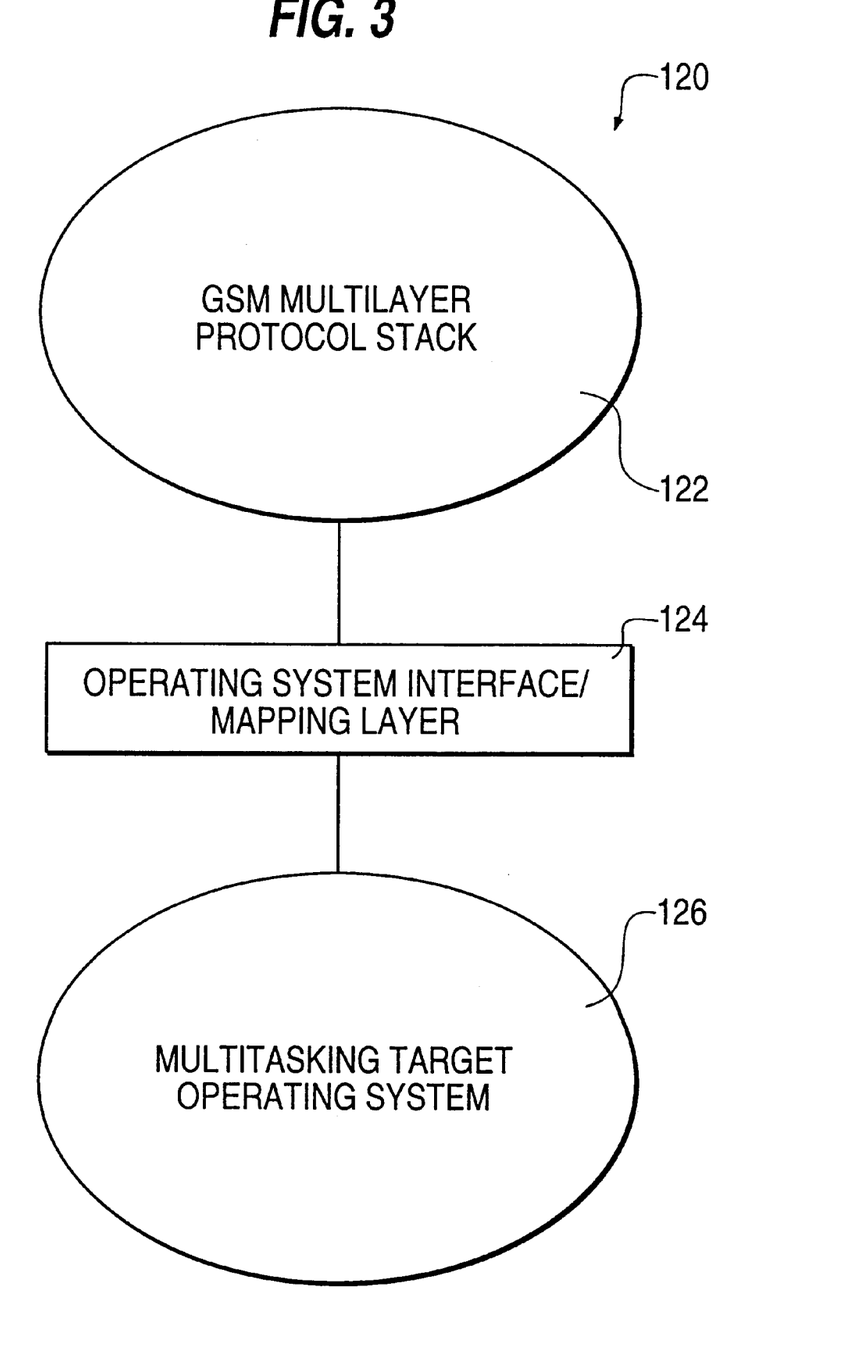
FIG. 3 is a block diagram of a preferred embodiment of the present invention including an operating system interface for use in a GSM transceiver.

Attached hereto is an Appendix which is written in the C program language containing pages A1 and A2 which is an example of the operating system interface mapping layer 124 of FIG. 3 in accordance with the present invention. The code of the Appendix maps the universal and generic instruction set used for programming tasks of the multilayer protocol stack 122 onto the instruction set of the CMX operating system for execution on a Siemens 8016C microprocessor. Specifically, the routines contained in the Appendix map the GSMSendMessage, GSMGetMessage, GSMDisableInterrupts and GSMRestoreCPUState instructions of the multilayer protocol stack onto the instruction set of the CMX operating system so that the multilayer protocol stack is independent of the underlying operating system. The subject matter of the Appendix is copyrighted and a limited license is granted for the purpose of copying the program disclosed therein for purposes of understanding or analyzing the invention but no rights are granted to make a copy for any other purpose including the loading of a processing device with the code of the Appendix in any form or language.

TECHNICAL FIELD

The present invention relates to GSM transceiving units and more particularly to portable multilayer protocol stacks for use in GSM transceivers in which the portable multilayer protocol stack is adaptable to different operating systems without rewriting thereof.

BACKGROUND ART

The GSM communication system (global system for mobile communications) is a TDMA telecommunications system providing time multiplexed communications between mobile units and base stations contained in the GSM communication system. The GSM communication system, including transceiver units, is defined by published specifications which have been adopted over the years.

The functionality of a GSM transceiver in the GSM communication system is defined by the aforementioned GSM specifications and includes a multilayer protocol stack containing software executed with a microprocessor. A first layer of the protocol stack interfaces with the hardware and controls communications to and from the second and third protocol layers. The second and third protocol layers control communications to and from the first layer and utilize services provided by the first protocol layer to communicate with the GSM network. The communications between the GSM network and GSM transceivers are time multiplexed into GSM frames. Each GSM frame has a fixed time duration and is divided into multiple segments each containing a plurality of bits all in accordance with the aforementioned published GSM specifications.

Figure 1:
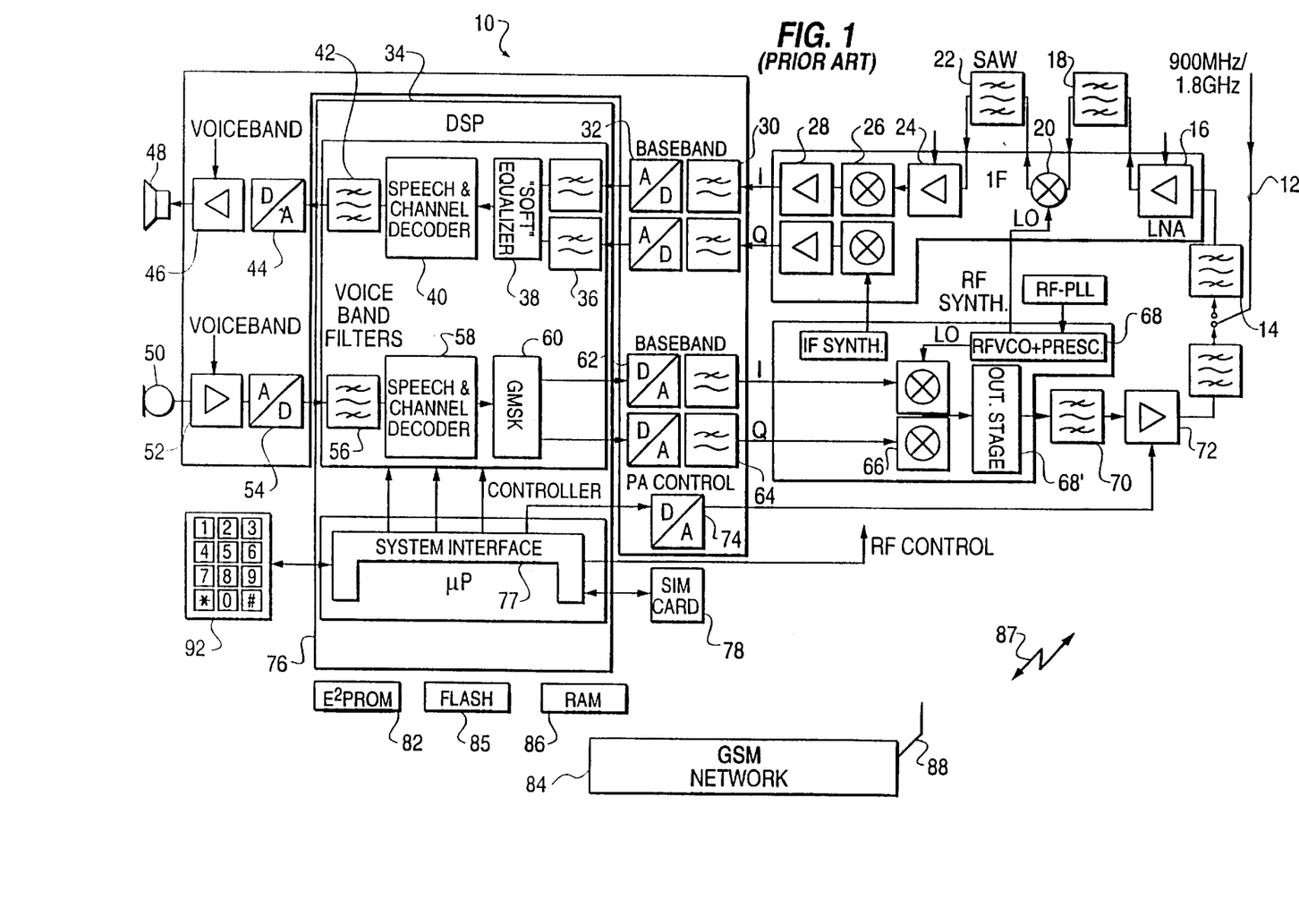
FIG. 1 is a block diagram of a GSM transceiver and network in accordance with the prior art.

FIG. 1 illustrates a block diagram of a prior art transceiving unit which is disclosed in a catalog entitled "ICs for Communications" published by Siemens AG and identified as Product Overview 09.95. Standard functional notations are utilized to identify the functional elements in the block diagram of FIG. 1. Only a brief overview description of FIG. 1 will be given to describe the overall design of a GSM transceiver in which the present invention may be practiced and its relationship to a GSM network.

The GSM transceiver 10 is a double conversion heterodyne PM receiver with phase shifting circuitry for I/Q demodulation. Antenna 12 is connected through filter 14 to low noise amplifier 16 which is in turn connected to filter 18. The output of filter 18 is connected to mixer 20 which shifts the received signal down to an intermediate frequency. The output of mixer 20 is connected to filter 22 and the output of filter 22 is connected to amplifier 24. The output of amplifier 24 is connected to mixer 26 which shifts the signal to the baseband. The output of mixer 26 is connected to amplifiers 28 whose I and Q outputs are respectively connected to filters 30 having outputs applied to A to D converters 32. The outputs of the A to D converters 32 are connected to a digital signal processor 34 which includes filters 36 which are connected to the outputs of the A to D converters 32, a soft equalizer 38 which is connected to the output of the filters 36 and a speech and channel decoder 40. The output of the speech and channel decoder 40 is connected to filter 42 whose output is connected to D to A converter 44 whose output is applied to amplifier 46 which drives speaker 48 to provide audio to a user. Speech of the user is detected by microphone 50 which is connected to amplifier 52 having an output connected to A to D converter 54. The output of A to D converter 54 is connected to filter 56 having an output connected to speech and channel encoder 58. The outputs of speech and channel encoder 58 are connected to a GMSK encoder 60 having a pair of outputs which are applied to D to A converters 62 with the outputs thereof being connected to filters 64 which respectively output I and Q signals. The I and Q signals are connected to mixers 66 which are driven by RFVCO 68 to convert the signal from the baseband to the RF band. The output of mixers 66 is connected to output stage 68'. The output of output stage 68' is connected to filter 70. The output of filter 70 is connected to output amplifier 72 which is controlled by a power amplifier control 74 in the form of a D to A converter. Microprocessor 76 controls the overall system including the power amplifier control 74 and provides a system interface 77. The system interface 77 generates chip select signals, internal clock signals, GSM specific control and timing signals via programmable timers for programmable interrupts on timer values and provides a chip card interface to a SIM card 78. The interface 77 also provides connectivity to a keypad 80. The microprocessor 76 is connected to a $E^2PROM$ 82, a flash memory 85, and RAM 86.

As illustrated, a GSM network 84, which is in accordance with GSM specifications including base stations and related switching architecture, transmits and receives communications between individual transceiver units 10 via RF transmission 87. The communications are time multiplexed into GSM frames each containing 8 time slots each containing multiple bits. Base stations (not illustrated) of the GSM network 84 each have an antenna 88 which transmits and receives the aforementioned time multiplexed GSM frames.

Each GSM transceiver, such as the unit 10 illustrated in FIG. 1 in accordance with the published GSM specifications, has a multilayer protocol stack including first, second and third layers. Instructions must be issued to the hardware to allow the hardware to perform in accordance with the published GSM specifications in the GSM frames with either a frame advance or a frame delay which is required to be an integer multiple of the time duration of a GSM frame. This permits designers of hardware for implementing GSM transceivers to provide for pipeline frame delays or frame advances in terms of an integer multiple of the time duration of a GSM frame between the protocol stack and the hardware which suit the design requirements of the hardware. The first three layers of the GSM protocol stack conforms to the overall OSI network model for providing a universal multi-layer protocol stack.

In order to provide the functionality of the first three layers of the multilayer protocol stack of the GSM specifications, substantial software is required. This software requires substantial time and effort to write and is complex. Furthermore, because of the diversity of the designs used by the numerous manufacturers of chipsets used in GSM transceivers and operating systems, the software required to implement the first three layers of the protocol stack of a GSM transceiver is uniquely suited to and developed for a particular chipset which prevents the protocol stack from being portable to other chipiets and operating systems and therefore usable with other chipsets and operating systems without substantial rewriting of the code contained therein. A need exists in the art for a mechanism to permit the first three layers of the protocol stack in accordance with the GSM specifications to be utilized with different chipsets and/or operating systems without requiring substantial rewriting of the software of the protocol stack to be in compliance with the particular characteristics of the chipset and operating system to which the protocol stack is applied.

U.S. Pat. No. 5,265,252 discloses a device driver system having a core which manages specific functions performed by a plurality of I/O devices. The core includes an operating system interface that is generic to different operating systems. Each operating system has a device driver interface which is unique to the operating system. A conversion program is layered between the core and the operating system for converting communications between the device driver interface of the generic operating system interface of the core.

Figure 2:
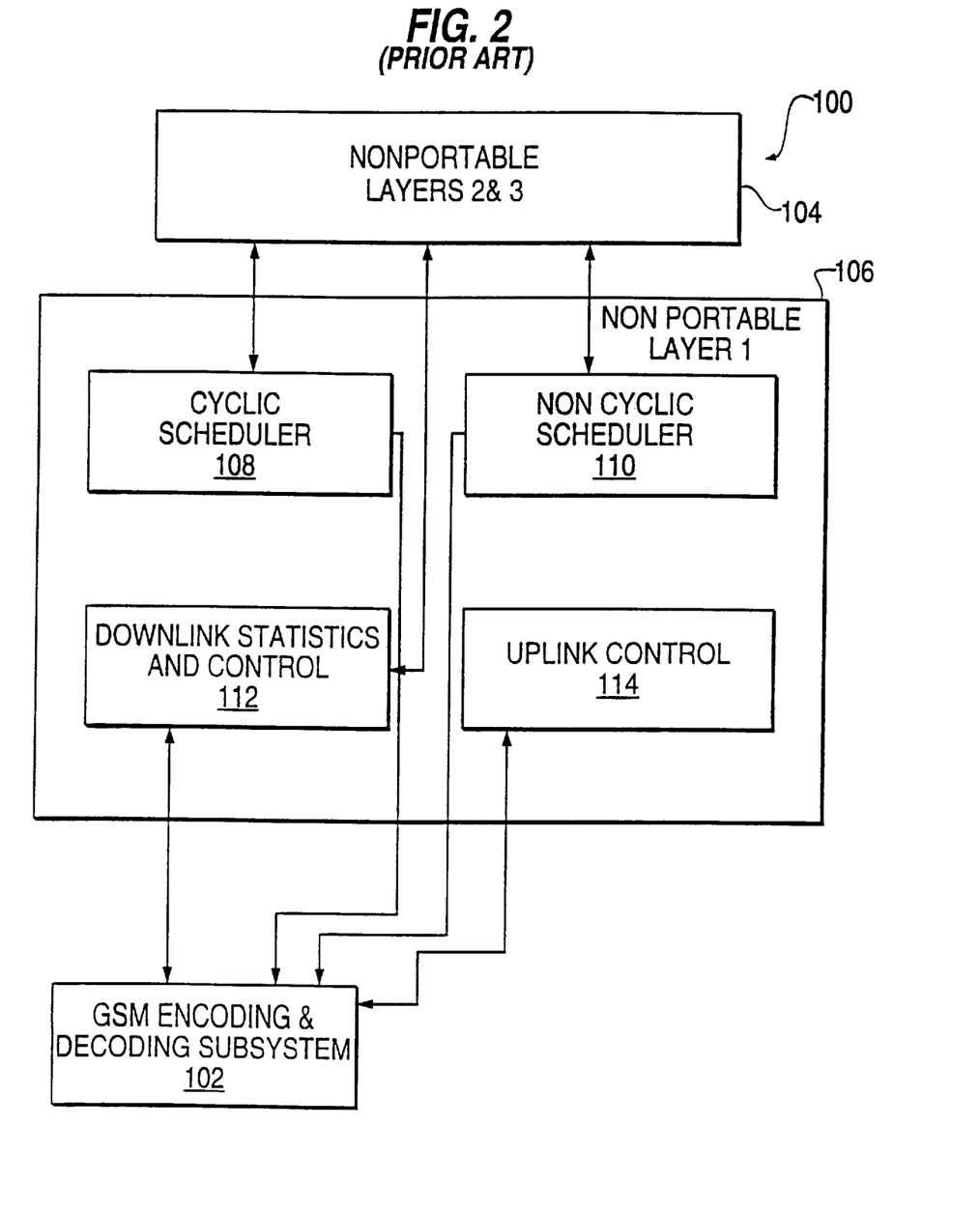
FIG. 2 is a block diagram of a prior art GSM multilayer protocol stack.

FIG. 2 illustrates a block diagram of a GSM prior art multiple layer protocol stack 100 of the type utilized with a transceiver unit 10 of FIG. 1. The overall protocol stack 100, as illustrated, may be associated with hardware 102 which is represented by the hardware 10 of FIG. 1. Layers 2 and 3 identified by reference numeral 104 are well known and comply with the published GSM specifications including timing requirements. Layer 1, which is identified by reference numeral 106, is comprised of multiple software modules which exist in diverse implementations for performing the overall functions contained in the layer 1 block diagram.

Cyclic scheduler 108 takes a GSM channel configuration description from layer 3 and arranges for appropriate instructions to be given to the GSM encoding and decoding subsystem 102 at the required times in order for the required channel structure to be implemented. The channel configurations are described in GSM specifications 05.02, section 6.4. The cyclic scheduler 108 has software which is uniquely written for the particular GSM encoding and decoding subsystem 102 which prevents it from being portable and adaptable without substantial rewriting to be useful with other hardware configurations and/or operating systems.

Non-cyclic scheduler 110 performs the task of scheduling instructions to be carried by out by layer 1 which do not occur on a cyclical basis. The scheduled instructions typically are requests from the layer 3 to deliver information about base stations other than the base station currently camped onto by the transceiver unit 10 which is controlled by the cyclical scheduler 108. The non-cyclical scheduler 110 finds idle GSM frames into which requests from the layer 3 can be placed without interfering with the ongoing work of the cyclic scheduler 108. The non-cyclic scheduler 110 has software which is uniquely written for the particular GSM encoding and decoding subsystem 102 which prevents it from being portable and adaptable without substantial rewriting to be useful with other hardware configurations and/or operating systems.

Downlinked statistics and control 112 performs the task of monitoring the absolute radio frequency channel control number to determine the absolute power and reception quality as measured in accordance with GSM published specifications 05.08, chapter 8. The result is reported to the layer 3. Synchronization and MS carrier frequency are maintained as specified in GSM specifications 05.10, section 6.

Uplink control 114 functions to control the uplinked transmitted power of the MS on a frame by frame basis as ordered by the base station in accordance with published GSM specifications 05.08, section 4.7.

Layers 1–3 in prior art GSM transceivers 10 have specialized code which is unique to the associated particular hardware and/or operating systems. This code typically has timing requirements for scheduling instructions which are unique to each hardware design and instructions unique to particular operating systems. As a result, the programming for implementing layers 1–3 for use with any particular hardware configuration of a particular chipset has little or no portability (adaptability without great reprogramming effort) to other hardware configurations and/or operating systems.

One of the reasons, as stated above, why the prior art layers 1–3 of the protocol stack are not applicable (portable) to different operating systems is universal code for implementing the functions of the protocol stack does not exist for the diverse types of operating systems which exist for the diversity of microprocessors which may be used with GSM transceivers.

A need exists in the art for portable GSM first, second and third protocol stack layers which may be utilized with different operating systems without substantial rewriting of the code thereof.

DISCLOSURE OF THE INVENTION

The present invention is an improved GSM transceiver for use in a GSM network having a multilayer protocol stack which operates on any one of a plurality of operating systems of at least one processor used for implementing the multilayer protocol stack without rewriting of the code of the multilayer portable protocol stack. In accordance with the invention, the multilayer protocol stack executes a plurality of asynchronous tasks which are encoded with a universal and generic instruction set, containing a plurality of instructions used for communicating between and synchronizing the tasks which may be used with different operating systems. At least one processor is controlled by a multitasking operating system selected from a plurality of operating systems which each are adaptable to be used with the universal and generic instruction set of the multilayer protocol stack to execute the asynchronous tasks associated with the operation of the multilayer protocol stack.

The portability of the multilayer protocol stack is accomplished by providing an operating system interface, which is responsive to the universal and generic instruction set, for translating each of the universal instructions into a sequence of at least one instruction of an instruction set of the selected operating system which is chosen from a plurality of operating systems so that the selected operating system executes the asynchronous tasks. As a result, the multilayer protocol stack is independent of the selected operating system because each universal instruction of the multilayer protocol stack may be defined as a sequence of at least one instruction of each of the plurality of operating system's instruction set. This permits the multilayer protocol stack, in accordance with the present invention, which contains substantial computer code, to be made portable and generic for use with diverse types of operating systems which may be selected to operate on the at least one processor utilized in a GSM transceiver in accordance with the GSM specifications. As a result, diverse types of chipsets and diverse types of operating systems may be chosen to operate in conjunction with the multilayer protocol stack with only modification of the operating system interface to define each instruction of the universal set of instructions utilized for programming the multilayer protocol stack in terms of and as a sequence of at least one instruction of the instruction set of the selected operating system.

In a preferred embodiment of the present invention, the code of the protocol stack may be implemented in the C programming language with the instructions GSMSendMessage and GSMGetMessage providing communications between the operations of the asynchronous tasks of the multilayer protocol stack and further, the instructions GSM-DisableInterrupts and GSMRestoreCPUState providing simple global mutual exclusion locking of global data shared between tasks and release of the mutual exclusion locking. These universal and generic instructions are each defined in the interface as a sequence of at least one instruction of the instruction set of the selected operating system which is chosen from a plurality of operating systems.

Each selected operating system supports communications between the multiple tasks of the multilayer protocol stack by means of a message queue which is private to a single process. The message queue is a mailbox in which each process fetches only messages from its own mailbox. When a process attempts to communicate with another process, it receives messages in its mailbox from the another process.

The priority of the task executing the interrupt must be made higher than any other task in the system in order to prevent that task from being interrupted by any other task and furthermore, the operating system must also provide the capability for the task which has been interrupted to be restored to its original state by means of the restore instruction.

In accordance with the preferred embodiment of the present invention, all processes of the portable multilayer protocol stack may be implemented with universal and generic instruction set as described above for transmitting and receiving information and further instructions for interrupting tasks with a higher priority task and then thereafter restoring execution of the interrupted task. The operating system interface provides the translation of the universal and generic instruction set of the aforementioned four instructions into the sequence of the operating system instructions of the particular operating system so that the operating system executes the asynchronous tasks which are necessary for operation of the multilayer protocol stack in a GSM transceiver.

BRIEF DESCRIPTION OF DRAWINGS

Like reference numerals identify like parts throughout the drawings.

BEST MODE FOR CARRYING OUT THE INVENTION

FIG. 3 illustrates a block diagram of a preferred embodiment 120 of the present invention including a GSM multilayer protocol stack 122, an operating system interface/mapping layer 124 and multitasking operating system 126. It should be understood that the preferred embodiment 120 represents software which is executed by at least one processor in a GSM transceiver such as that illustrated in FIG. 1. A preferred embodiment of the protocol stack 122 is described below in FIG. 4 and is described in more detail in U.S. patent application Ser. No. 08/766,583, now U.S. Pat. No. 6,064,660 entitled GSM Transceiver With Portable Protocol Stack, filed on Dec. 12, 1996. The GSM multilayer protocol stack includes a first layer controlling communications with the at least one processor and second and third layers controlling communications to and from the first layer and services provided by the first layer for communicating with the GSM network as illustrated in FIG. 1. The multilayer protocol stack 122 executes a plurality of asynchronous tasks which are encoded with a universal and generic instruction set as described below in detail containing a plurality of instructions used for communicating between and synchronizing the asynchronous tasks. The operating system interface 124 provides a mechanism by which the GSM multilayer protocol stack 122 programmed with the universal and generic instruction set is made independent of the instruction set of the selected multitasking target operating system 126 as described below.

The operating system interface 124 defines each instruction of the universal and generic instruction set to be carried out by the operating system 126 as a sequence of at least one instruction of the operating system instruction set. In the preferred embodiment of the invention, each operating system is chosen from a plurality of operating systems with each of the plurality of operating systems having an operating system instruction set which may be used to define each instruction of the universal and generic instruction set as a sequence of at least one instruction of each operating system instruction set.

The overall purpose of the operating system interface/mapping layer 124 is to map the universal and generic set of instructions required to program the GSM multilayer protocol stack 122 onto the instruction set of the selected operating system to execute the necessary asynchronous tasks required to be performed by the protocol stack. As will be described in more detail below, the preferred embodiment of the present invention provides for the complete accomplishment of all of the tasks of the GSM multilayer protocol stack 122 with only four universal and generic instructions.

The operating system interface/mapping layer 124 contains routines comprised of the instructions of the operating system instruction set defining each universal and generic instruction of the GSM multilayer protocol stack 122. Each routine is comprised of a sequence of at least one instruction of the operating system instruction set required to perform the required functions of the GSM multilayer protocol stack. For example, the universal and generic instruction described below for sending information in a particular operating system may contain a single call to a corresponding routine or instruction of the multitasking target operating system 126 or a sequence of calls to routines or instructions of the multitasking target operating system. The function of the interface/mapping layer 124 is to schedule a task for execution by the operating system of the one or more processors which are contained in the GSM transceiver such as, but not limited to, the GSM transceiver illustrated in FIG. 1. The multitasking target operating system 126 is selected from a plurality of target operating systems which each have an operating system instruction set which may be programmed to execute the universal and generic instruction set of the protocol stack including providing prioritized execution of the tasks. The multitasking target operating system 126 is chosen in conjunction with the at least one microprocessor to implement execution of the GSM multilayer protocol stack 122. The operating system interface/mapping layer 124, as described above, facilitates the target operating system being responsive to the universal and generic instruction set of the portable GSM multilayer stack 122 to cause each of the universal instructions contained therein to be carried out by the multitasking target operating system 126 by executing at least one and usually a plurality of operating system instructions to execute each programmed universal and generic instruction of the protocol stack.

The set of universal and generic instructions executed by the portable multilayer protocol stack 122 in a preferred embodiment of the present invention is described as follows. Those instructions are broken down into two groups with the first group involving the communication of information between the tasks performed by the GSM multilayer protocol stack 122 and the second group providing preemptive prioritized multitasking such that any task may be interrupted by a higher priority task followed by a restoration of execution of the interrupted task.

Additionally, the multitasking target operating system 126 must provide instructions for programming communications between processes through a message queue which is private to a single process which may be referred to as a mailbox. The operating system must provide operating system instructions for implementing a mailbox and provide a means whereby the priority of the interrupting task may be made higher than any other task in the operating system in order to prevent the task from being interrupted by another task and also must provide a means for the priority of that task to be restored to its original state.

A preferred embodiment of an implementation of the operating system interface/mapping layer 124 is set forth in the Appendix hereto. The example set forth in the Appendix is an implementation of the mapping of the universal and generic instruction set onto the instruction set of the underlying operating system: SendMessage, GetMessage; DisableInterrupts and RestoreCPUState so that the protocol stack is independent of the actual underlying multitasking target operating system 126. The example set forth in the Appendix is the mapping of the universal and generic instruction set onto a CMX operating system running on a Siemens 80166 microprocessor. The actual implementation for other operating systems would vary depending upon the instruction set which the selected operating system implements but the overall function of the operating system/ mapping layer 124 remains unchanged in providing for a universal and generic and portable GSM multilayer protocol stack 122 to be used in conjunction with any one of a plurality of multitasking target operation systems 126. As a result of providing of the operating system interface/ mapping layer 124, the required code for mapping the universal generic and portable GSM multilayer protocol stack 122 onto any one of a plurality of multitasking operating systems 126 which may be implemented on at least one microprocessor as illustrated in the GSM transceiver of FIG. 1, only requires the writing of a particular operating system interface/mapping layer 124 necessary to support the aforementioned universal and generic instructions in the set of operating system instructions of the selected multitasking target operating system 126. It is not necessary to rewrite the GSM multilayer protocol stack code, which is voluminous, to work in conjunction with a particular operating system which is the technique which has been utilized in the prior art resulting in tremendous inefficiencies in the development of portable software for use in different microprocessors or in conjunction with different operating systems on the same microprocessor in GSM transceiver units.

Figure 4:
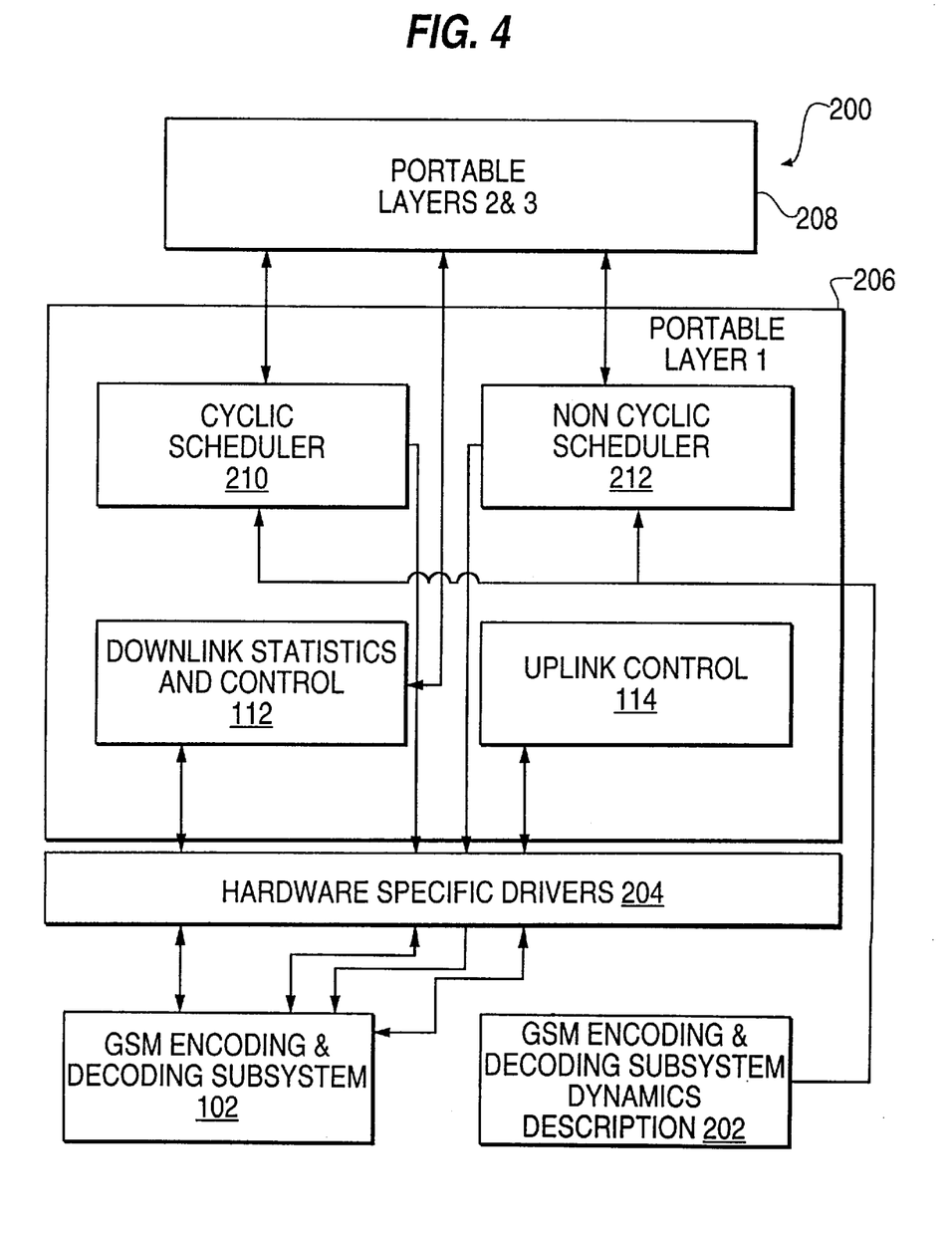
FIG. 4 is a block diagram of a preferred embodiment of the multilayer protocol stack used with the preferred embodiment of the present invention.

FIG. 4 illustrates a preferred embodiment of a GSM multilayer protocol stack 122 which may be practiced in accordance with the present invention. The GSM multilayer protocol stack 200, which may be used as an implementation of the GSM multilayer protocol stack 122 of FIG. 3, differs from the prior art of FIG. 2 in that a GSM encoding and decoding subsystem dynamics description 202 provides hardware time constants used for scheduling each instruction of the cyclic scheduler 210 and the non-cyclic scheduler 212 in frames to control the particular integer multiple of the fixed time duration of GSM frames which is assigned as either a frame delay or a frame advance for each instruction to be scheduled in one of the frames and further in that hardware specific drivers 204 are provided for interfacing between the specific hardware of the GSM encoding and decoding subsystem 102 and the portable layer 1. The rewriting of the dynamics description 202 and the hardware specific drivers 204 is all that is required to adapt the protocol stack to a different hardware design and requires substantially less effort than the rewriting of layers 1–3 of the prior art of FIG. 2. The generic cyclic scheduler 210 and the generic scheduler 212 and the downlink statistics control 112 and the uplink control 114 are generic to all hardware designs and do not require rewriting. The cyclic scheduler 210 and non-cyclic scheduler 212, instead of containing fixed code which is written specifically for a particular hardware configuration to be associated with the cyclic scheduler and non-cyclic scheduler, accesses the GSM encoding and decoding subsystem dynamics description 202 to obtain the hardware constants for particular instructions to be scheduled with an integer multiple of the fixed time duration of a frame-which is assigned for scheduling a particular instruction in a frame as a frame delay or frame advance to make the software of the cyclic scheduler 210 and non-cyclic scheduler 212 generically operative in diverse hardware configurations having different frame advances or frame delays which are multiples of the GSM frame time interval.

While the invention has been described in terms of a preferred embodiment, it should be understood that numerous modifications may be made thereto without departing from the spirit and scope of the invention as defined in the appended claims. It is intended that all such modifications fall within the scope of the appended claims.

APPENDIX

```
void GSMSendMessage(GSM_MAIL_BOX MBox,
INT16 Prim, void *Mess)
{
  GSM_MESSAGE *MsgPtr;
  GSM_CPU_STATE OldState;
  Oldstate=GSMDisableInterrupts();
  if (MessPool==NULL)
    {
    GSMRestoreCPUState(OldState);
    MsgPtr=GSM_NEW(GSM_MESSAGE);
    }
  else
    {
    MsgPtr=MessPool;
    MessPool=MessPool->Data;
    GSMRestoreCPUState(OldState);
    }
  MsgPtr->Data=Mess;
  MsgPtr->Prim=Prim;
  if(cxmssend(MBox, MsgPtr) !=AOK)
    }
    GSMcprintf(MEMPutChar, "GSMSendMessage unsuccessftil! ");
    OldState=GSMDisableInterrupts();
    MsgPtr->Data=MessPool;
    MessPool=MsgPtr;
    GSMRestoreCPUState(OldState);
    }
}
void GSMGetMessage(GSM_MAIL_BOX MBox,
INT16 *Prim, void **Mess)
{
GSM_MESSAGE *MsgPtr;
GSM_CPU_STATE OldState;
MsgPtr=cxmswatm(MBox,O);
*Mess=MsgPtr->Data;
*Prim=MsgPtr->Prim:
OldState=GSMDisableInterrupts();
MsgPtr->Data=Messpool:
MessPool=MsgPtr:
GSMRestoreCPUState(OldState);
}
GSM_CPU_STATE GSMDisableInterrupts(UINT16 IntLevel)
{
GSM_CPU_STATE Result=PSW;
IntLevel &=15;
IntLevel<<=12;
if(Result<IntLevel)
  {
  IEN=0;
  NOP;
  NOP;
  PSW=(Result&0x07FF)|IntLevel|0x0800;
  }
return Result;
}
void GSMRestoreCPUState(GSM_CPU_STATE OldState)
{
PSW=Oldstate|0x0800;
}
```

What is claimed is:

1. A GSM transceiver for use in a GSM network comprising:
   a multilayer protocol stack for executing a plurality of asynchronous tasks which are encoded with a universal instruction set used for communicating between and synchronizing the tasks, said protocol stack comprising:
   a plurality of dynamics description parameters containing at least one frame delay and at least one frame advance, each frame delay and frame advance representing an integer multiple of a fixed time duration for a particular instruction to be scheduled in a frame, and
   at least one scheduler for scheduling instructions in frames based on the dynamics description parameters, each instruction being either delayed or advanced by the at least one scheduler by an integer multiple of the fixed time duration for that instruction contained in the dynamics description parameters;
   a multitasking operating system having a set of operating system instructions and providing prioritized execution of the tasks by execution of the operating system instructions;
   an operating system interface causing instructions of the universal instruction set to be carried out by the multitasking operating system so that each universal instruction of the universal instruction set is executed as a sequence of at least one instruction of the operating system instruction set, each instruction of the universal instruction set is generic and independent of the instructions of the operating system; and
   at least one processor controlled by the operating system to execute the asynchronous tasks.

2. A GSM transceiver in accordance with claim 1 wherein:
   the operating system is selected from a plurality of operating systems, each operating system having an operating system instruction set which may define each instruction of the universal instruction set as a sequence of at least one instruction of the operating system instruction set.

3. A GSM transceiver in accordance with claim 1 wherein:
   the multilayer protocol stack includes a first layer controlling communications with the at least one processor and second and third layers controlling communications to and from the first layer and services provided by the first layer for communicating with the GSM network.

4. A GSM transceiver in accordance with claim 2 wherein:
   the multilayer protocol stack includes a first layer controlling communications with the at least one processor and second and third layers controlling communications to and from the first layer and services provided by the first layer for communicating with the GSM network.

5. A GSM transceiver in accordance with claim 1 wherein:
   the operating system instruction set provides for communications between the multiple tasks with a message queue which is private to each task and with any task communicating with another task by placing information transmissions in the queue.

6. A GSM transceiver in accordance with claim 2 wherein:
   the operating system instruction set provides for communications between the multiple tasks with a message queue which is private to each task and with any task communicating with another task by placing information transmissions in the queue.

7. A GSM transceiver in accordance with claim 3 wherein:
   the operating system instruction set provides for communications between the multiple tasks with a message queue which is private to each task and with any task communicating with another task by placing information transmissions in the queue.

8. A GSM transceiver in accordance with claim 4 wherein:
   the operating system instruction set provides for communications between the multiple tasks with a message queue which is private to each task and with any task communicating with another task by placing information transmissions in the queue.

9. A GSM transceiver in accordance with claim 1 wherein:
   the operating system instruction set permits encoding of an operation for sending and an operation for retrieving information transmissions between tasks.

10. A GSM transceiver in accordance with claim 1 wherein:

the operating system instruction set permits encoding of an operation for interrupting execution of a task and an operation for restoring execution of a task.

11. A GSM transceiver in accordance with claim 1 wherein:

the operating system instruction set permits encoding of an operation for sending and an operation for retrieving information transmissions between tasks and an operation for interrupting execution of a task and an operation for restoring execution of a task.

12. A GSM transceiver in accordance with claim 2 wherein:

the operating system instruction set permits encoding of an operation for sending and an operation for retrieving information transmissions between tasks.

13. A GSM transceiver in accordance with claim 2 wherein:

the operating system instruction set permits encoding of an operation for interrupting execution of a task and an operation for restoring execution of a task.

14. A GSM transceiver in accordance with claim 2 wherein:

the operating system instruction set permits encoding of an operation for sending and an operation for retrieving information transmissions between tasks and an operation for interrupting execution of a task and an operation for restoring execution of a task.

15. A GSM transceiver in accordance with claim 3 wherein:

the operating system instruction set permits encoding of an operation for sending and an operation for retrieving information transmissions between tasks.

16. A GSM transceiver in accordance with claim 3 wherein:

the operating system instruction set permits encoding of an operation for interrupting execution of a task and an operation for restoring execution of a task.

17. A GSM transceiver in accordance with claim 3 wherein:

the operating system instruction set permits encoding of an operation for sending and an operation for retrieving information transmissions between tasks and an operation for interrupting execution of a task and an operation for restoring execution of a task.

18. A GSM transceiver in accordance with claim 4 wherein:

the operating system instruction set permits encoding of an operation for sending and an operation for retrieving information transmissions between tasks.

19. A GSM transceiver in accordance with claim 4 wherein:

the operating system instruction set permits encoding of an operation for interrupting execution of a task and an operation for restoring execution of a task.

20. A GSM transceiver in accordance with claim 4 wherein:

the operating system instruction set permits encoding of an operation for sending and an operation for retrieving information transmissions between tasks and an operation for interrupting execution of a task and an operation for restoring execution of a task.

21. A GSM transceiver in accordance with claim 5 wherein:

the operating system instruction set permits encoding of an operation for sending and an operation for retrieving information transmissions between tasks.

22. A GSM transceiver in accordance with claim 5 wherein:

the operating system instruction set permits encoding of an operation for interrupting execution of a task and an operation for restoring execution of a task.

23. A GSM transceiver in accordance with claim 5 wherein:

the operating system instruction set permits encoding of an operation for sending and an operation for retrieving information transmissions between tasks and an operation for interrupting execution of a task and an operation for restoring execution of a task.

24. A GSM transceiver in accordance with claim 6 wherein:

the operating system instruction set permits encoding of an operation for sending and an operation for retrieving information transmissions between tasks.

25. A GSM transceiver in accordance with claim 6 wherein:

the operating system instruction set permits encoding of an operation for interrupting execution of a task and an operation for restoring execution of a task.

26. A GSM transceiver in accordance with claim 6 wherein:

the operating system instruction set permits encoding of an operation for sending and an operation for retrieving information transmissions between tasks and an operation for interrupting execution of a task and an operation for restoring execution of a task.

27. A GSM transceiver in accordance with claim 7 wherein:

the operating system instruction set permits encoding of an operation for sending and an operation for retrieving information transmissions between tasks.

28. A GSM transceiver in accordance with claim 7 wherein:

the operating system instruction set permits encoding of an operation for interrupting execution of a task and an operation for restoring execution of a task.

29. A GSM transceiver in accordance with claim 7 wherein:

the operating system instruction set permits encoding of an operation for sending and an operation for retrieving information transmissions between tasks and an operation for interrupting execution of a task and an operation for restoring execution of a task.

30. A GSM transceiver in accordance with claim 8 wherein:

the operating system instruction set permits encoding of an operation for sending and an operation for retrieving information transmissions between tasks.

31. A GSM transceiver in accordance with claim 8 wherein:

the operating system instruction set permits encoding of an operation for interrupting execution of a task and an operation for restoring execution of a task.

32. A GSM transceiver in accordance with claim 8 wherein:

the operating system instruction set permits encoding of an operation for sending and an operation for retrieving information transmissions between tasks and an operation for interrupting execution of a task and an operation for restoring execution of a task.

* * * * *